June 17, 1969     J. D. WEIR     3,449,793
MACHINE FOR WORKING RUBBER AND LIKE PLASTICS
Filed April 21, 1967     Sheet 3 of 3
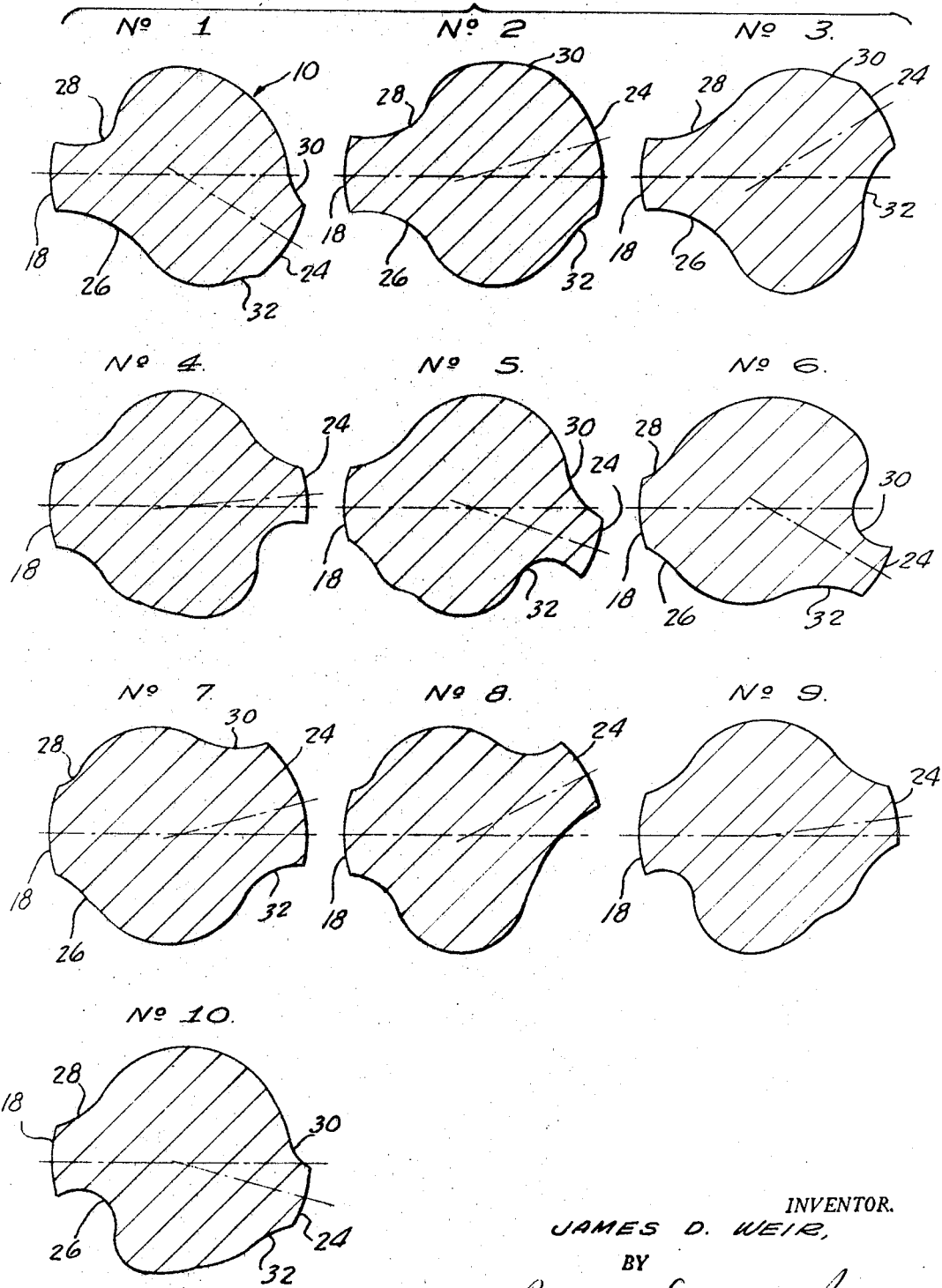

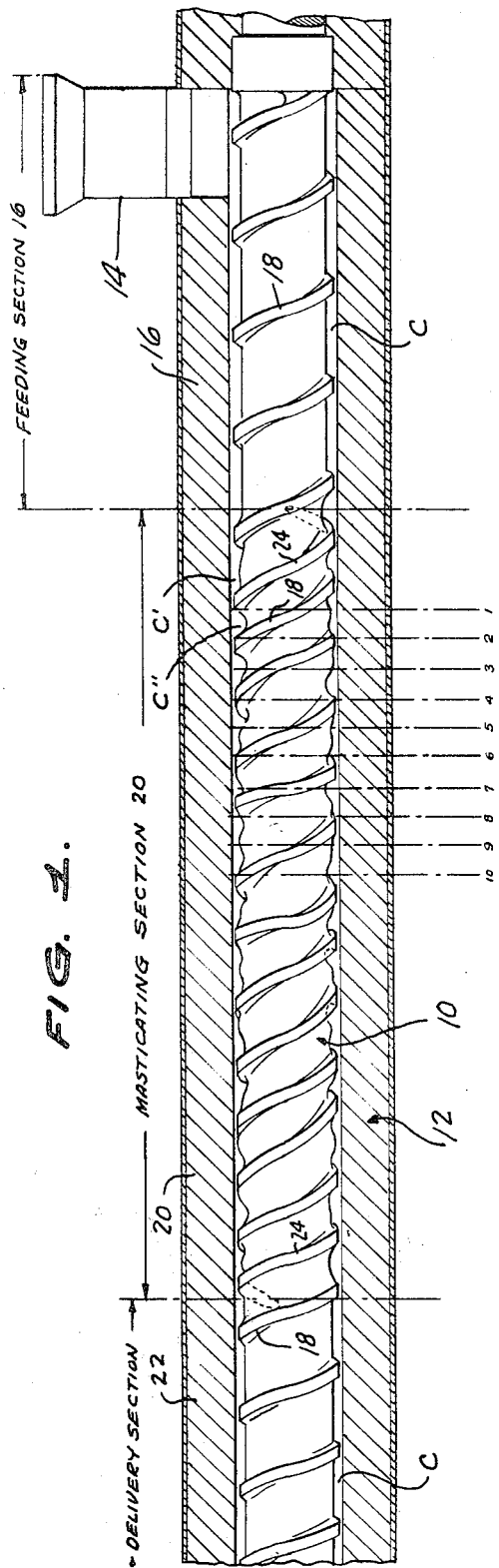

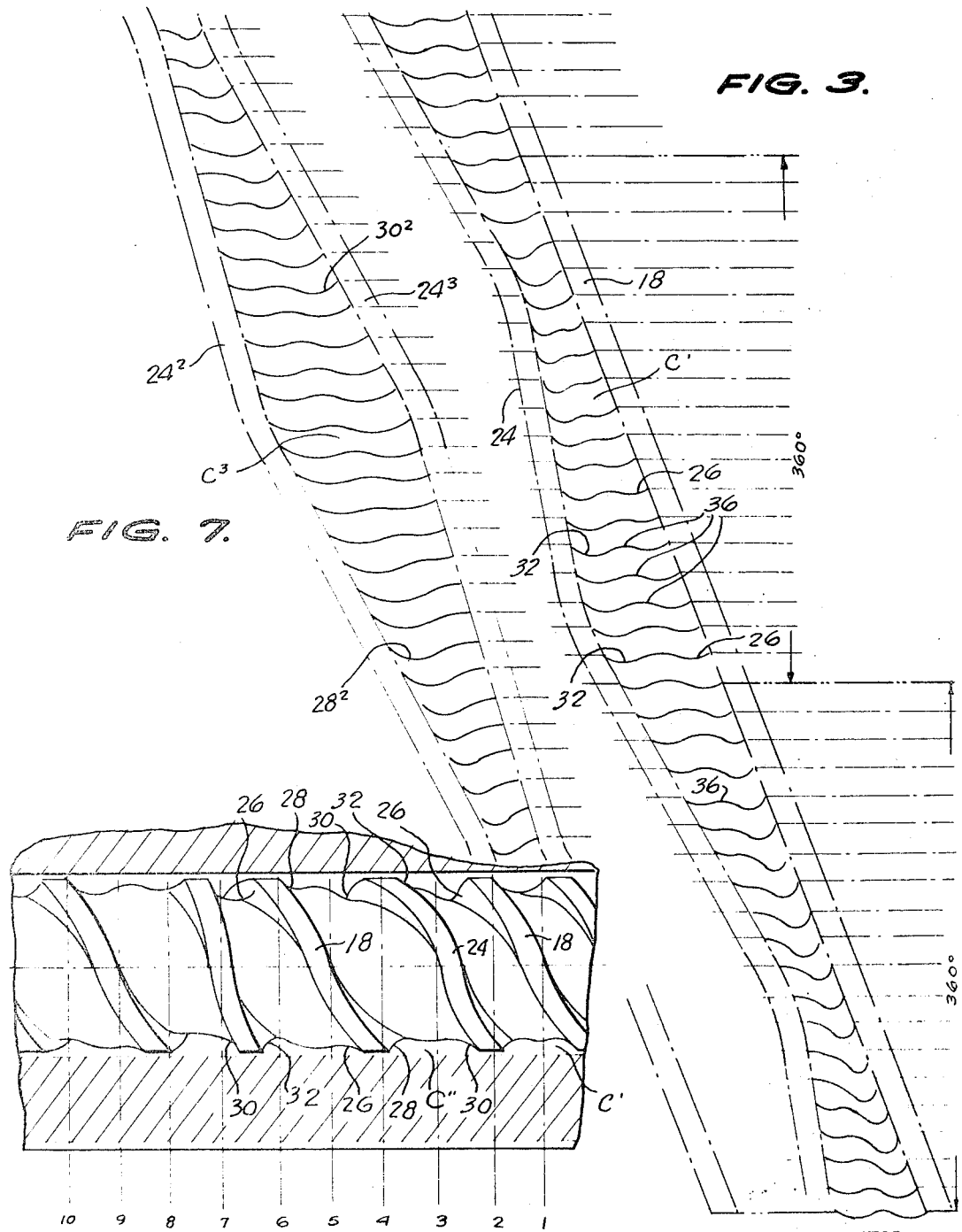

United States Patent Office 3,449,793
Patented June 17, 1969

3,449,793
MACHINE FOR WORKING RUBBER AND LIKE PLASTICS
James D. Weir, Anchorage, Ky., assignor to International Rubber Industries, Inc., Louisville, Ky.
Filed Apr. 21, 1967, Ser. No. 632,812
Int. Cl. B01f 7/08
U.S. Cl. 18—12                                      9 Claims

ABSTRACT OF THE DISCLOSURE

A machine for working plastics in a continuous operation, and having a hollow cylinder with a feed inlet at one end and a delivery outlet at the other, a screw rotatably mounted in the cylinder and having feeding, masticating and delivery sections disposed sequentially therealong, said screw having at least one thread whose pitch varies so as to increase and decrease within the length of the masticating section to define with said cylinder a plastic flow channel whose cross-sectional area increases and decreases. Desirably, a pair of grooves of varying depth is provided at the root of the thread, one groove on each side, the depth of the first groove increasing as that of the second decreases causing the plastic to shift laterally across the channel as it flows around and progresses axially forwardly along the screw. Each of said grooves preferably both increases and decreases in depth within the length of the masticating section. Desirably, an additional thread is formed on the screw for the entire length of the masticating section, said additional thread having either a constant pitch or a varying pitch. When two or more threads are provided, a pair of grooves is formed at the root of each thread so that the two grooves in the channel formed between the two threads will alternately increase and decrease in depth as the thread progresses along the screw.

---

This invention relates to machines for working (including mixing, masticating, plastifying and preheating) rubber and rubber-like plastics and compositions formed thereof, and more particularly to improvements in the feed screw theerof, as for example, the screw of a cold-feed extruder.

It is, of course, well known in the art to provide various forms of feed screws in extruders according to the type of plastic material which is being worked. Generally, such screws have a feeding section leading to a masticating section and culminate in a delivery section at the mouth of the extruder. In the masticating section, with which this invention is primarily concerned, it is known to employ a thread, or flight, having a constant pitch, but in which the root diameter is progressively decreased so that the channel defined between axially spaced portions of the thread and the enclosing cylinder of the screw is progressively decreased in height, or radially of the screw, as the thread progresses around and axially forward along the screw. Such a construction progressively squeezes the plastic material more and more as it approaches the delivery section, thus providing a squeezing in one direction, i.e., radially of the screw.

It is also known to provide extruder screws formed with a double thread of different, but constant pitch whereby to change the width of the channel formed between the two threads, thereby squeezing the plastic longitudinally of the channel as it progresses axially along the screw. In some instances it has been suggested that the root diameter between the double threads be both increased and decreased, thereby imparting a successive expansion and squeezing, or contraction, of the plastic in the radial direction as it moves along the channel due to rotation of the screw.

It is a principal object of the present invention to provide an improvement in the construction of the masticating sections of conventional feed screws whereby the channel along which the plastic is moved is so shaped as to alternately squeeze and expand the plastic in each of three directions perpendicular to each other, i.e., longitudinally, laterally, and vertically of the channel, to thereby increase the efficiency of the mixing, plastifying, masticating and heating of the plastic components. The longitudinal squeezing and expanding is obtained by providing the channel walls in the form of a thread having a constantly varying pitch so that the walls progressively approach each other and spread apart. The lateral squeezing and expansion is obtained by providing a pair of grooves at opposite sides of the channel adjacent the thread walls and which vary in depth, one groove increasing when the other decreases in depth. This presses the plastic from the shallower groove to the deeper groove across the channel. The radial squeezing and expanding of the plastic is caused by the bottom walls of said grooves which vary in depth, and change the vertical height of the channel. In addition, if desired, the root diameter of the screw thread may vary preferably in a manner generally inverse to the width of the thread, or to the channel between threads.

It is another object of the invention to provide an improved screw assembly having the above described characteristics, so constructed as to be capable of performing on a continuous basis the functions of an intensive internal mixer, a mixing mill, and a warm-up mill, as well as a conventional cold-feed extruder.

A further object of the invention is to provide an improved device, having the above described characteristics, wherein the masticating section of the screw is provided with a single variable pitch thread in which the variation is such that at any successive given point along the thread length the distance between thread portions measured axially is not a constant.

Still another object of the invention is to provide an improved screw, having the above described characteristics, in which the masticating portion is formed by a double thread at least one of which varies in pitch, such variation being constant, or regular, or inconstant, or irregular.

A still further object of the invention is to provide an improved screw, having the above described characteristics, in which the masticating portion is provided with at least two threads both of which vary in pitch.

The novel features which are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a longitudinal axial section taken vertically through the improved screw portion of an extruder according to the invention;

FIG. 2 is a fragmentary enlarged sectional view, similar to that of FIG. 1, but showing only a portion of the masticating section;

FIG. 3 is a development view of a portion of the threads in the masticating section of the screw of FIG. 1;

FIG. 4 illustrates cross-sectionally the screw in various parts numbered 1–10 taken successively at 90° intervals of rotation on the lines 1–10 in FIG. 2, and also in FIG. 1, the sections being rotated to place the standard pitch thread at the left and horizontally in each of the ten views;

FIG. 5 is a fragmentary elevational view of the masticating section of a modified screw employing only one thread having a constantly varying pitch;

FIG. 6 is an elevational view similar to FIG. 5, showing another modification in which two threads each of variable pitch are formed in the masticating section of the screw; and FIG. 7 is a developmental view similar to FIG. 3 of a portion of the threads in the masticating section of the screw of FIG. 6.

Referring now more particularly to the drawings, and first specifically to FIGS. 1–4, there is shown a preferred embodiment of the improved screw generally indicated at 10. The screw is housed in what may be a conventional hot or cold feed extruder in the bore of a cylinder 12, preferably of uniform diameter. A hopper 14 is provided to feed the components of the plastic to be mixed into the bore of cylinder 12 at the beginning of the feeding section 16, legended in FIG. 1. In this section the screw is provided with a thread 18 which may be of constant pitch as shown, or may have an irregular or varying pitch, if desired. The thread continues through the masticating section 20 and through the delivery section 22 to an outlet of the extruder, not shown. Desirably, the screw 10 has an outside diameter which is very slightly smaller than the diameter of the bore of the cylinder 12 so that upon rotation by power means, not shown, the mass of plastic components fed through the hopper 14 will move along the screw in the channel C passing through the feeding, masticating and delivery sections successively in a well-recognized manner of operation of such screws.

In the masticating section a second thread 24 is formed on the screw which desirably has a constantly varying pitch. Thus, between the cylinder 16, the shaft of screw 10 and axially spaced portions of the threads 18, 24 are formed two spiral chambers C', C'', FIG. 2, progressing around the screw from the feeding section to the delivery section through which the plastic components being mixed and plastified must pass by reason of pressure of the rotating threads.

In FIGS. 3 thread 18 appears to be straight as in the development view, the screw being rolled along the development surface. The rate of change of pitch of thread 24, whether it is constant or interrupted, regular or irregular, and the shape of the curve, proportional to amplitude and frequency of pitch change, is expressed by a sinusoidal curve which may be preselected depending upon the plastic materials being worked and the nature of the resulting material desired. The sinusoidal curve representing thread 24 at the left of FIG. 3 has been chosen as a suitable example to illustrate that the pitch is both increased and decreased, the increase tending to widen the channel C' between threads 18, 24, and the decrease tending to narrow the channel C'. The corresponding channel C'' is simultaneously narrowed and widened. Desirably, at least one increase and one decrease of pitch of thread 24 should be utilized in the length of the masticating section. FIG. 3 illustrates two complete convolutions of the screw which represent less than half its length in the masticating section.

At opposite sides of the standard pitch thread 18 is formed a pair of grooves 26, 28, see FIGS. 2 and 4, which vary in depth as the grooves and the thread progress around the screw. A similar pair of grooves 30, 32, is formed, one on each side of the non-standard pitch thread 24, these grooves also varying in depth. One groove of each pair appears in the channels C', C'' for plastic flow, as indicated in FIG. 3 by the wavy lines 36 representing the bottom surface of the channel C' at about 20° intervals, the grooves appearing at the opposite end of each line. It will be apparent from examination of FIG. 3 that the grooves are shaped so that of the pair within the channel C' one groove will constantly increase and the other decrease in depth as the grooves progress around the screw, and that once a maximum depth has been reached in one groove it will begin to decrease when simultaneously the companion groove will begin to increase in depth. Thus, the height of channel C' at opposite sides constantly varies in such a manner as to cause the shallow groove at one side to push the plastic laterally of the channel toward the companion and deeper groove on the other side. At the same time, the variations in the depth of the grooves cause an expansion and a squeezing vertically of the flowing plastic between the channel floor including the grooves and the channel ceiling formed by the cylinder 12.

A clear visualization of the construction of the screw thus far described will be obtained upon study of the sectional views of the screw included in FIG. 4. Referring first to section No. 2 of FIG. 4, the centers of threads 18, 24 are shown as being approximately 210° counterclockwise apart. The standard pitch thread 18 has been rotated into the horizontal appearing at the left of the section. This view has been taken on line 2 of FIG. 1, where it intersects the thread at the top of FIG. 1 so that the rotation amounts to 90° for this particular section. The section No. 1 shows the screw similarly rotated to place the standard pitch thread in the same relative position, the section having been taken along line 1 which precedes the second section by 90° of rotation of the screw. In section No. 1 the thread 24 is only about 150° counterclockwise from thread 18. Similarly, section No. 3 is taken on line 3 of FIG. 1, and the angular counterclockwise spacing between threads 18, 24 has now increased to about 225°. In section No. 4 the two threads are approximately 200° counterclockwise apart. In section No. 5 the two threads are about 260° counterclockwise apart, and in section No. 6 the two threads are about 150° counterclockwise apart. The variation in angular spacing between threads in sections Nos. 2 and 6 represents one full rotation of the screw, or 360°, the two threads spreading apart and coming closer together during said revolution by reason of the variation in pitch of thread 24. Such separation and approach continues through sections 7–10 representing a second complete revolution of the screw and further revolutions will cause the pattern of section 1–10 to repeat in sequence. The pair of grooves 26, 28, one on each side of thread 18, is shown to be deepest in section No. 1 and getting successively shallower in sections 2 through 6. Starting with section 7, these grooves begin to get deeper progressively through sections 8–10, being again deepest in section No. 1. At the same time the pair of grooves 30, 32, one on each side of thread 24, are shown to be shallowest in section No. 1, and starting to become deeper in section No. 2 and continuing successively to become deeper in sections 3 through 6. When the other pair of grooves change toward becoming deeper, the grooves 30, 32 start to become shallower, as in section 7, and progressively continue to become shallower through sections 8, 9 and 10, becoming shallowest again in section No. 1. It is, therefore, seen that the floors of the channels C', C'' between threads 18, 24 are wavy and defined by curvature of the bottoms of the four grooves and that of the connecting screw shaft surfaces. As a result, the height of each of the two channels varies from side-to-side so that turning of the screw will tend to force the plastic components from a shallow groove portion toward and into the deeper companion groove portion. Thus, as the threads 18, 24 approach each other at the sides of the channels C', C'' and the grooves 26–32 at the sides of the channels change in depth, pressures are exerted on the plastic flowing in the channels longitudinally thereof which tend to both squeeze, or compress, and expand, or decompress the plastic in each of three directions at right angles to each other, one direction being along the length of the channel, the second direction being along the width, or laterally of the channel, and the third direction being radially of the screw, or vertically of the channel. The change in depth of the channels may be considered to be a change in the root diameters of the two threads and any suitable way of forming the threads and grooves, such as by molding or casting, or by machining while varying the root diameter of the threads, may be utilized to form the screw according to the invention.

In operation, turning of the screw, feeds the plastic components as a mixture into the masticating section, the continuous variation of the cross-sectional shape and area of the channels between the threads further defined by the root diameter of the screw shaft and the bore of the cylinder, forces the mixture along the channels C', C" and causes the plastic mass continually to change its shape and direction of movement as the result of the alternate squeezing and expansion in each of the three perpendicular directions defining said channels, as explained above. As a result an exceedingly efficient kneading action upon the plastic is obtained, insuring a high measure of uniformity in the product delivered at the output of the delivery section. In addition to the alternate squeezing and expansion mentioned, there are changes in flow speed of portions of the moving mass of plastic resulting from the change in volume of various portions of the channel, as between the widely separated portions and the closely spaced portions of the threads and the deep grooves and the shallow grooves. Thus, channel parts of reducing volume cause a portion of the plastic to increase its speed of movement, and those portions of plastic entering enlarging volumes, reduce their speed of movement. As a result, a cutting action of layers, or portions, of the plastic with respect to one another is obtained which greatly improves the masticating effect of the device. Consequently, it will be seen that in processing rubber and plastics for continuous use, that the thorough mixing and mastication required will be more efficiently obtained than with conventional screws. The delivered plastic will be more homogeneous which is important when it is considered that the feed arrangement for devices for this type must be made to accommodate components or additives in the form of pellets, powders, liquids, strips or solid plastic masses which may be fed into the hopper under pressure, gravity-feed, self-feed, or by metering devices.

In FIG. 5 is illustrated the masticating section of a modified screw in which only one thread 24' is used. However, this thread is formed with a constantly varying pitch, or pitch angle, so that the channel $C^2$ formed between longitudinally spaced portions of the thread for conveying the plastic will alternately narrow and widen in the same manner as explained for channel C' of the embodiment of FIG. 1. On each side of the thread 24' are formed grooves 30', 32' which, therefore, appear at opposite sides of the channel $C^2$ and these grooves are so formed that one decreases in depth as the other increases in depth in the same manner as previously described for the grooves 26, 32 or 28, 30 of FIG. 2.

The resulting operation of the screw of FIG. 5 is similar to that as previously described for the embodiment of FIG. 1, in spite of the fact that a standard pitch thread has been omitted, the main diffeernce being that only a single channel of varying width is provided in the masticating section instead of two.

FIG. 6 illustrates still another embodiment of the masticating section of the screw in which again two threads $24^2$, $24^3$ are utilized. However, both of these threads employ constantly varying pitch. A pair of grooves $26^2$, $28^2$ is formed on each side of thread $24^2$ and a similar pair of grooves $30^2$, $32^2$ is formed on each side of thread $24^3$. These two pairs of grooves are dimensioned and positioned in the same manner as described for the corresponding grooves 26, 28, 30 and 32 of FIG. 2

FIG. 7 is a development view of the two threads $24^2$, $24^3$ of the FIG. 6 embodiment, showing that both are of variable pitch. As a result, the narrowing and widening of each of the channels $C^3$, $C^4$ between the two threads are increased in amplitude, and in the resultant operation of the screw with both threads varying in patch an increased effect of mixing, masticating and plastifying, as well as heating engendered by increased friction, is obtained.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:
1. A machine for working plastics in a continuous operation, comprising a cylinder having a uniform diameter bore, an inlet at one end and an outlet at the other end, a screw rotatably mounted in said cylinder bore and having a feeding section, a masticating section and a delivery section, said screw having in its masticating section at least one thread whose pitch varies, increasing and decreasing within the length of said masticating section to define with said cylinder a plastic flow channel whose cross-sectional area increases and decreases.
2. A machine according to claim 1 wherein a pair of grooves of varying depth is provided at the root of said thread one on each side, the depth of the first groove increasing as the depth of the second decreases whereby to shift the plastic laterally across said channel as it flows around and progresses axially forward along the screw.
3. A machine according to claim 2 wherein each of said grooves both increases and decreases in depth within the length of the masticating section.
4. A machine according to claim 1 wherein said screw has an additional thread formed therein and extending the length of the masticating section, said additional thread having a constant pitch.
5. A machine according to claim 1 wherein said screw has an additional thread formed therein and extending the length of the masticating section, said additional thread also varying in pitch to both increase and decrease within the length of the masticating section.
6. A machine according to claim 4 wherein two pairs of grooves of varying depth are provided at the roots of said threads, a groove at each side of each thread, the groove on the lead side of one thread increasing in depth as the groove on the trailing side of the adjacent thread decreases in depth so as to cause lateral flow of plastic across the channel formed between said threads.
7. A machine according to claim 5 wherein two pairs of grooves of varying depth are provided at the roots of said threads, a groove at each side of each thread, the groove on the lead side of one thread increasing in depth as the groove on the trailing side of the adjacent thread decreases in depth so as to cause lateral flow of plastic across the channel formed between said threads.
8. A machine according to claim 1 wherein the pitch of said thread varies continuously in accordance with a selected sinusoidal curve.
9. A machine according to claim 5 wherein the pitch of each of said threads varies continuously in accordance with selected sinusoidal curves.

References Cited

UNITED STATES PATENTS

| | | |
|---|---|---|
| 2,556,276 | 6/1951 | Henning. |
| 2,744,287 | 5/1956 | Parshall et al. |
| 2,765,490 | 10/1956 | Zona. |
| 3,123,860 | 3/1964 | Vesilind. |
| 3,300,810 | 1/1967 | Gregory et al. |

WILLIAM J. STEPHENSON, *Primary Examiner.*